US012610988B2

(12) United States Patent
Yan et al.

(10) Patent No.: US 12,610,988 B2
(45) Date of Patent: Apr. 28, 2026

(54) AEROSOL GENERATING DEVICE AND CONTROL METHOD THEREOF

(71) Applicant: SHENZHEN FIRST UNION TECHNOLOGY CO., LTD., Shenzhen (CN)

(72) Inventors: Dongjun Yan, Shenzhen (CN); Ruilong Hu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 294 days.

(21) Appl. No.: 18/251,716

(22) PCT Filed: Nov. 3, 2021

(86) PCT No.: PCT/CN2021/128440
§ 371 (c)(1),
(2) Date: May 4, 2023

(87) PCT Pub. No.: WO2022/095900
PCT Pub. Date: May 12, 2022

(65) Prior Publication Data

US 2023/0404167 A1 Dec. 21, 2023

(30) Foreign Application Priority Data

Nov. 4, 2020 (CN) ......................... 202011215665.6

(51) Int. Cl.
*A24F 40/57* (2020.01)
*A24F 40/46* (2020.01)
(Continued)

(52) U.S. Cl.
CPC .............. *A24F 40/57* (2020.01); *A24F 40/46* (2020.01); *A24F 40/48* (2020.01); *A24F 40/51* (2020.01); *H05B 3/0071* (2013.01)

(58) Field of Classification Search
CPC ....................................................... A24F 40/57
See application file for complete search history.

(56) References Cited

U.S. PATENT DOCUMENTS

2020/0038601 A1 2/2020 Hepworth
2020/0170301 A1* 6/2020 Gallagher .............. A24F 40/30
(Continued)

FOREIGN PATENT DOCUMENTS

CN 104146353 A 11/2014
CN 206062123 U 4/2017
(Continued)

*Primary Examiner* — Michael H. Wilson
*Assistant Examiner* — Daniel Edward Vakili
(74) *Attorney, Agent, or Firm* — Proi Intellectual Property US

(57) ABSTRACT

This application provides an aerosol generation device and a control method thereof. The aerosol generation device includes, a housing, provided with a through hole and an air inlet; a cavity, where an aerosol-forming substrate is received in the cavity or removed from the cavity through the through hole; a heater, configured to heat the aerosol-forming substrate received in the cavity; a heat drain device, arranged on a gas flow path extending between the air inlet and the through hole; and a circuit, configured to, after the heater starts for heating and before the heater enters an inhalation stage, control the heat drain device to start operation to drain hot air generated by heating out of the housing along the gas flow path. Before a smoker inhales on the aerosol generation device, the heat drain device drains an aerosol comprising vapor out of the housing.

19 Claims, 5 Drawing Sheets

(51) Int. Cl.

| | |
|---|---|
| ***A24F 40/48*** | (2020.01) |
| ***A24F 40/51*** | (2020.01) |
| ***H05B 3/00*** | (2006.01) |

(56) References Cited

U.S. PATENT DOCUMENTS

| | | | | |
|---|---|---|---|---|
| 2020/0345075 | A1* | 11/2020 | Hepworth ............... | A24F 40/46 |
| 2023/0051032 | A1* | 2/2023 | Han ........................ | A24F 13/00 |

FOREIGN PATENT DOCUMENTS

| | | | | |
|---|---|---|---|---|
| CN | 107105780 | A | 8/2017 | |
| CN | 110558623 | A | 12/2019 | |
| CN | 110897203 | A | 3/2020 | |
| CN | 110973704 | A | 4/2020 | |
| CN | 111542236 | A | 8/2020 | |
| CN | 111820476 | A | 10/2020 | |
| WO | 2013083635 | A | 6/2013 | |
| WO | 2018178114 | A2 | 10/2018 | |
| WO | 2018178114 | A3 | 12/2018 | |
| WO | 2019096983 | A1 | 5/2019 | |
| WO | WO-2019138325 | A1 * | 7/2019 | ............... A24F 1/30 |

* cited by examiner

AEROSOL GENERATING DEVICE AND CONTROL METHOD THEREOF

CROSS-REFERENCE TO RELATED APPLICATIONS

This application claims priority to Chinese Patent Application No. 202011215665.6, filed with the China National Intellectual Property Administration on Nov. 4, 2020 and entitled "AEROSOL GENERATION DEVICE AND CONTROL METHOD THEREOF", which is incorporated herein by reference in its entirety.

TECHNICAL FIELD

This application relates to the field of cigarette device technologies, and in particular, to an aerosol generation device and a control method thereof.

BACKGROUND

This application provides an aerosol generation device and a control method thereof, to resolve a problem of a high temperature of an aerosol generated when an existing cigarette device heats a cigarette.

This application provides an aerosol generation device, configured to heat an aerosol-forming substrate to generate an aerosol for inhalation. The device includes:

- a housing, provided with a through hole and an air inlet;
- a cavity, where the aerosol-forming substrate is received in the cavity or removed from the cavity through the through hole;
- a heater, configured to heat the aerosol-forming substrate received in the cavity;
- a heat drain device, arranged on a gas flow path extending between the air inlet and the through hole; and
- a circuit, configured to, after the heater starts for heating and before the heater enters an inhalation stage, control the heat drain device to start operation to drain hot air generated by heating out of the housing along the gas flow path, where a temperature variation curve of the heater includes at least a temperature rise stage and the inhalation stage.

In the aerosol generation device and the control method thereof provided in this application, before a smoker inhales on the aerosol generation device, the heat drain device drains an aerosol comprising vapor out of the housing, thereby avoiding a problem that the smoker feels burning pain due to a high temperature of the aerosol when the smoker inhales the first puff, and improving inhaling experience of the user.

SUMMARY

This application provides an aerosol generation device and a control method thereof, to resolve a problem of a high temperature of an aerosol generated when an existing cigarette device heats a cigarette.

This application provides an aerosol generation device, configured to heat an aerosol-forming substrate to generate an aerosol for inhalation. The device includes:

- a housing, provided with a through hole and an air inlet;
- a cavity, where the aerosol-forming substrate is received in the cavity or removed from the cavity through the through hole;
- a heater, configured to heat the aerosol-forming substrate received in the cavity;
- a heat drain device, arranged on a gas flow path extending between the air inlet and the through hole; and
- a circuit, configured to, after the heater starts for heating and before the heater enters an inhalation stage, control the heat drain device to start operation to drain hot air generated by heating out of the housing along the gas flow path, where a temperature variation curve of the heater includes at least a temperature rise stage and the inhalation stage.

In the aerosol generation device and the control method thereof provided in this application, before a smoker inhales on the aerosol generation device, the heat drain device drains an aerosol comprising vapor out of the housing, thereby avoiding a problem that the smoker feels burning pain due to a high temperature of the aerosol when the smoker inhales the first puff, and improving inhaling experience of the user.

BRIEF DESCRIPTION OF THE DRAWINGS

One or more embodiments are described by way of example with reference to the corresponding figures in the accompanying drawings, and the exemplary descriptions are not to be construed as limiting the embodiments. Elements/modules and steps in the accompanying drawings that have same reference numerals are represented as similar elements/modules and steps, and unless otherwise particularly stated, the figures in the accompanying drawings are not drawn to scale.

DETAILED DESCRIPTION

For ease of understanding of this application, this application is described below in more detail with reference to accompanying drawings and specific implementations. It should be noted that, when an element is expressed as "being fixed to" another element, the element may be directly on the another element, or one or more intermediate elements may exist between the element and the another element. When an element is expressed as "being connected to" another element, the element may be directly connected to the another element, or one or more intermediate elements may exist between the element and the another element. The terms "upper", "lower", "left", "right", "inner", "outer", and similar expressions used in this specification are merely used for an illustrative purpose.

Unless otherwise defined, meanings of all technical and scientific terms used in this specification are the same as those usually understood by a person skilled in art of this application. The terms used in this specification of this application are merely intended to describe objectives of the specific implementations, and are not intended to limit this application. A term "and/or" used in this specification includes any or all combinations of one or more related listed items.

Figure 1:
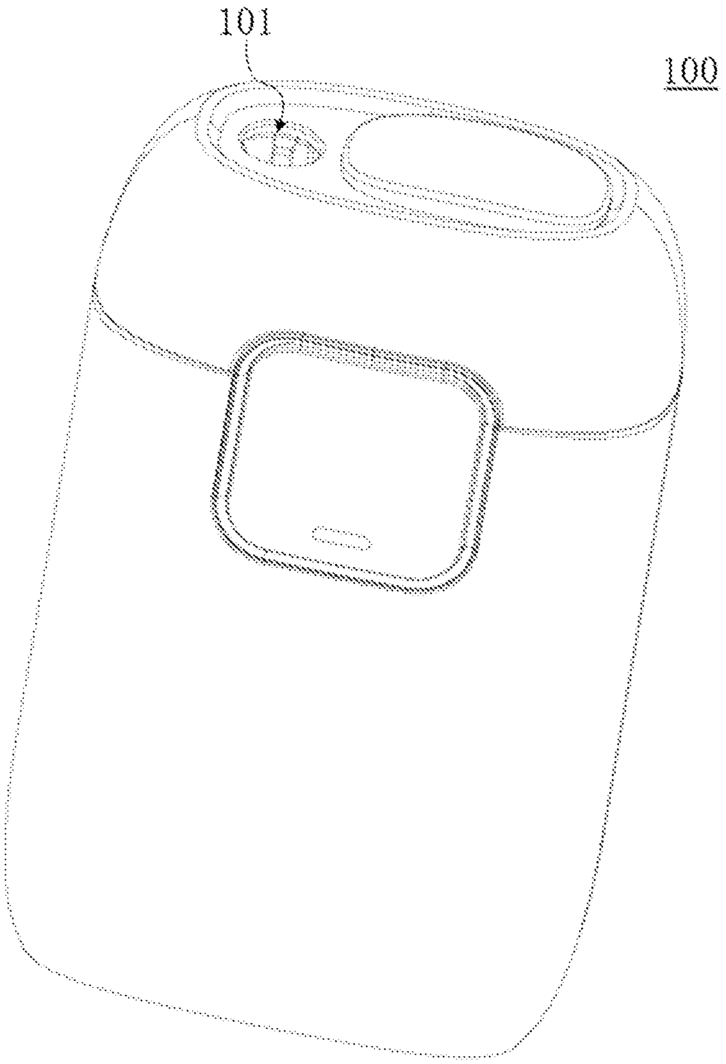
FIG. 1 is a schematic diagram of an aerosol generation device according to an implementation of this application.
Figure 2:
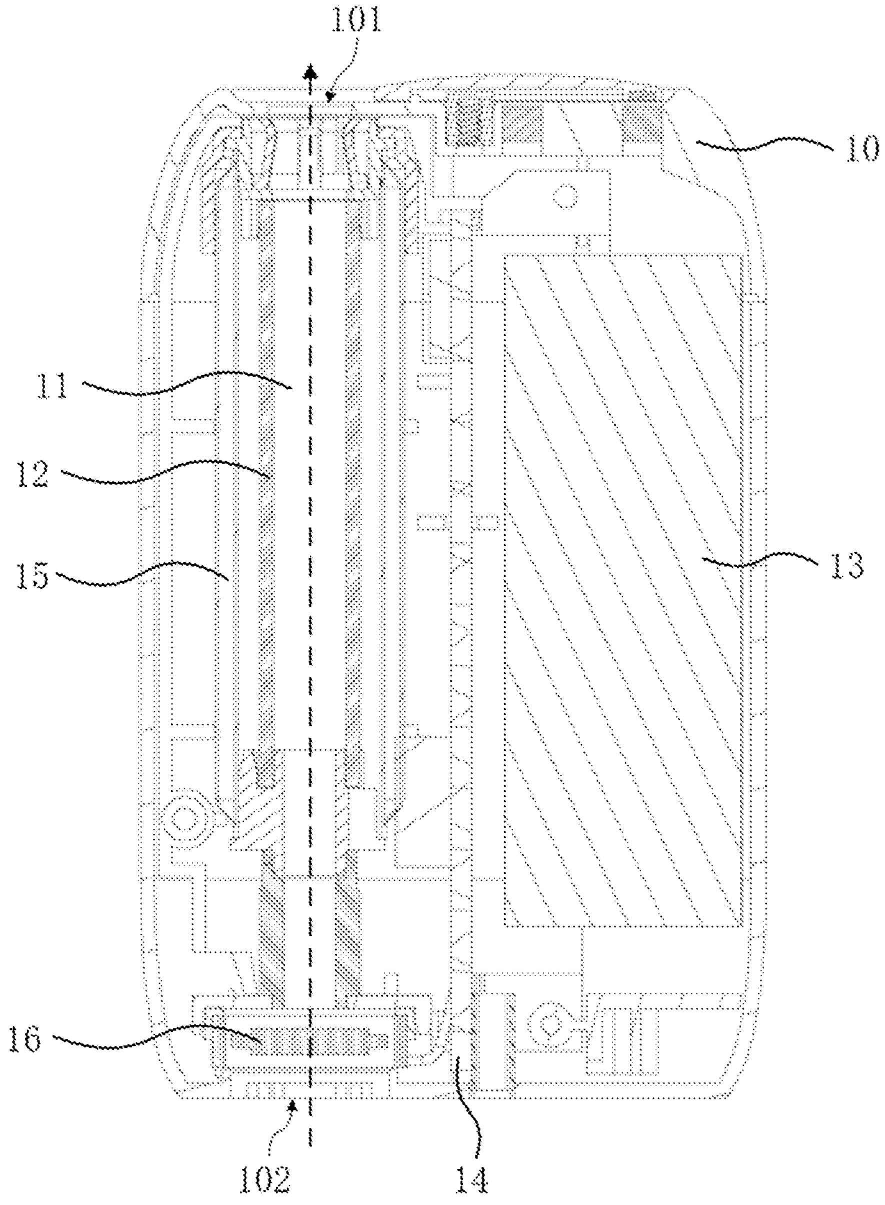
FIG. 2 is a cross-sectional view of an aerosol generation device according to an implementation of this application.

FIG. 1 to FIG. 2 show an aerosol generation device 100 according to an implementation of this application, and the device includes:

a housing 10 and a cavity 11. The housing 10 is internally provided with an accommodating space that may accommodate a heater 12, a battery cell 13, a circuit 14, and the like. The housing 10 has a near end and a far end opposite to each other, the near end is provided with a through hole 101, and the far end is provided with an air inlet 102, that is, the through hole 101 and the air inlet 102 are separated from each other. In another example, the air inlet 102 may be a part of the through hole 101, for example: after an aerosol-forming substrate is received in the cavity 11 through the through hole 101, air flows in from a gap between the aerosol-forming substrate and the through hole 101, that is, the gap forms the air inlet 102.

The aerosol-forming substrate may be received in the cavity 11 or removed from the cavity 11 through the through hole 101.

The aerosol-forming substrate is a substrate that can release volatile compounds forming aerosols. The volatile compounds can be released by heating the aerosol-forming substrate. The aerosol-forming substrate may be solid, liquid, or components including solid and liquid. The aerosol-forming substrate may be loaded onto a carrier or a support through adsorbing, coating, impregnating, or in other manners. The aerosol-forming substrate may conveniently be a part of an aerosol-forming article.

The aerosol-forming substrate may include nicotine. The aerosol-forming substrate may include tobaccos, for example, may include a tobacco-comprised material including volatile tobacco-aroma compounds, and the volatile tobacco-aroma compounds are released from the aerosol-forming substrate when the aerosol-forming substrate is heated. A preferred aerosol-forming substrate may include a homogeneous tobacco material. The aerosol-forming substrate may include at least one aerosol-forming agent, and the aerosol-forming agent may be any suitable known compound or a mixture of compounds. During use, the compound or the mixture of compounds facilitates to compact and stabilize formation of the aerosol and is substantially resistant to thermal degradation at an operating temperature of an aerosol-forming system. Suitable aerosol-forming agents are well known in the related art and include, but are not limited to: polyol, such as triethylene glycol, 1,3-butanediol, and glycerol; polyol ester, such as glycerol acetate, glycerol diacetate, or glycerol triacetate; and fatty acid ester of monobasic carboxylic acid, dibasic carboxylic acid, or polybasic carboxylic acid, such as dimethyl dodecane dibasic ester and dimethyl tetradecane dibasic ester. Preferably, the aerosol-forming agent is polyhydric alcohol or a mixture thereof, such as triethylene glycol, 1,3-butanediol, and most preferably glycerol.

The heater 12 is configured to generate infrared rays to perform radiant heating on the aerosol-forming substrate received in the cavity 11.

The battery cell 13 supplies power for operating the aerosol generation device 100. For example, the battery cell 13 may supply power to heat the heater 12. In addition, the battery cell 13 may supply power for operating other components provided in the aerosol generation device 100.

The battery cell 13 may be a rechargeable battery or a disposable battery. The battery cell 13 may be, but is not limited to, a lithium iron phosphate ($LiFePO_4$) battery. For example, the battery cell 13 may be a lithium cobaltate ($LiCoO_2$) battery or a lithium titanate battery.

The circuit 14 may control overall operations of the aerosol generation device 100. The circuit 14 not only controls operations of the battery cell 13 and the heater 12, but also controls operations of other components in the aerosol generation device 100. For example: the circuit 14 obtains temperature information of the heater 12 that is sensed by a temperature sensor, and controls, based on the information, power supplied to the heater 12 by the battery cell 13.

Figure 3:
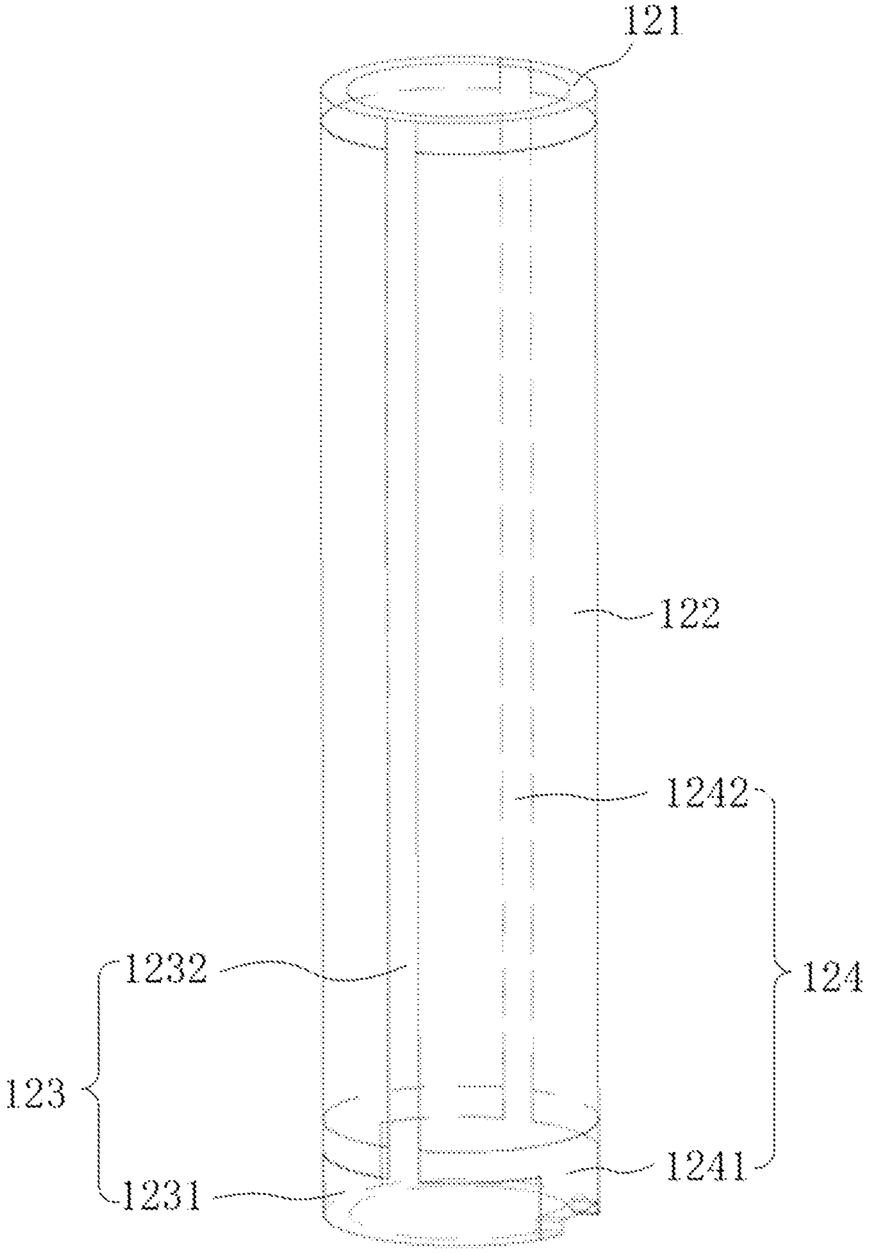
FIG. 3 is a schematic diagram of a heater according to an implementation of this application.

FIG. 3 shows a heater 12 according to an implementation of this application, and the heater 12 includes:

a base body 121, constructed as a tube extending in an axial direction of the cavity 11 and surrounding the cavity 11.

Specifically, the base body 121 includes a first end, a second end, and a surface extending between the first end and the second end. The base body 121 may be in a shape of a cylinder, a prism, or another column. Preferably, the base body 121 is in a shape of a cylinder, and a cylindrical hole penetrating through a middle part of the base body 121 forms at least a part of the cavity, where an inner diameter of the hole is slightly greater than an outer diameter of an aerosol-forming article, so that the aerosol-forming article may be easily placed in the cavity for heating.

The base body 121 may be made of a material that is high temperature-resistant and transparent, such as quartz glass, ceramic, or mica, or may be made of a material having a high infrared transmittance, for example: a high temperature-resistant material having an infrared transmittance higher than 95%, which is not specifically limited herein.

An infrared electrothermal coating 122 is formed on the surface of the base body 121. The infrared electrothermal coating 122 may be formed on an outer surface of the base body 121, or may be formed on an inner surface of the base body 121.

The infrared electrothermal coating 122 receives electric power and generates heat energy, to generate infrared rays of a specified wavelength, for example: far infrared rays of 8 μm-15 μm. When a wavelength of the infrared rays matches an absorption wavelength of the aerosol-forming substrate, energy of the infrared rays is easily absorbed by the aerosol-forming substrate. The infrared rays are not limited in wavelength, may be infrared rays of 0.75 μm-1000 μm, or preferably be far infrared rays of 1.5 μm-400 μm.

The infrared electrothermal coating 122 is preferably formed by infrared electrothermal ink, ceramic powder, and an inorganic adhesive that are fully stirred, evenly coated on the outer surface of the base body 121, and then dried for solidification for a specified period of time. A thickness of the infrared electrothermal coating 122 is 30 μm-50 μm. Certainly, the infrared electrothermal coating 122 may also be formed by tin(IV) chloride, tin(II) oxide, antimony(III) chloride, titanium(IV) chloride, and anhydrous copper(II) sulfate that are mixed in a specified proportion, stirred, and coated on the outer surface of the base body 121. Alternatively, the infrared electrothermal coating 122 may be one of a silicon carbide ceramic layer, a carbon fiber layer, a carbon fiber composite layer, a titanium zirconium oxide ceramic layer, a titanium zirconium nitride ceramic layer, a titanium zirconium boride ceramic layer, a titanium zirconium carbide ceramic layer, a ferric oxide ceramic layer, a ferric nitride ceramic layer, a ferric boride ceramic layer, a ferric carbide layer, a rare earth oxide ceramic layer, a rare earth nitride ceramic layer, a rare earth boride ceramic layer, a rare earth carbide layer, a nickel cobalt oxide ceramic layer, a nickel cobalt nitride ceramic layer, a nickel cobalt boride ceramic layer, a nickel cobalt carbide layer, or a high silica molecular sieve ceramic layer. The infrared electrothermal coating may also be a coating formed by another material, for example: derivatives and compounds with carbon as a part or all of component elements, including, but not limited to, carbon nanotubes, a carbon nanotube thin film, graphene, carbon fibers, a carbon fiber thin film, a carbon film, or a carbon fiber cloth.

Conductive components include a first electrode 123 and a second electrode 124 spaced on the base body 121, configured to feed the electric power to the infrared electrothermal coating 122.

Both the first electrode 123 and the electrode 124 are at least partially electrically connected to the infrared electrothermal coating 122, so that a current can flow from one electrode to the other electrode through the infrared electrothermal coating 122. The first electrode 123 and the second electrode 124 have opposite polarities, for example: the first electrode 123 is an anode, and the second electrode 124 is a cathode; or the first electrode 123 is a cathode, and the second electrode 124 is an anode.

In this example, both the first electrode 123 and the second electrode 124 are conductive coatings, the conductive coating may be a metal coating, a conductive tape, or the like, and the metal coating may be made of silver, gold, palladium, platinum, copper, nickel, molybdenum, tungsten, niobium, or an alloy material of the foregoing metal.

In this example, the first electrode 123 and the second electrode 124 are symmetrically arranged along a central shaft of the base body 121.

The first electrode 123 includes a coupled electrode 1231 extending in a circumferential direction of the base body 121 and a strip electrode 1232 extending from the coupled electrode 1231 to the near end in an axial direction, the coupled electrode 1231 is not in contact with the infrared electrothermal coating 122, and the strip electrode 1232 is at least partially in contact with the infrared electrothermal coating 122 to form an electrical connection.

The second electrode 124 includes a coupled electrode 1241 extending in the circumferential direction of the base body 121 and a strip electrode 1242 extending from the coupled electrode 1241 to the near end A in the axial direction, the coupled electrode 1241 is not in contact with the infrared electrothermal coating 122, and the strip electrode 1242 is at least partially in contact with the infrared electrothermal coating 122 to form an electrical connection.

It can be learned from the foregoing that, the strip electrode 1232 and the strip electrode 1242 are distributed evenly, thereby ensuring even heating of the infrared electrothermal coating 122, and improving heating efficiency of the cigarette device. The coupled electrode 1231 and the coupled electrode 1241 are arranged to be conveniently coupled to the battery cell 13, and avoid a problem that a wire connected to one end is easily damaged because the wire needs to pass through a heating area.

Further, referring to FIG. 2, the aerosol generation device 100 further includes a heat insulation tube 15 sleeved outside the base body 121. The heat insulation tube 15 has an inner tube and an outer tube in a radial direction, a sealed space is formed between the inner tube and the outer tube, and the sealed space may be pumped for vacuum, or may be filled with gas and heat insulation materials. The gas includes, but is not limited to, an inert gas, air, carbon dioxide, or the like, and the heat insulation materials include, but is not limited to, an aerogel, a mica sheet, a mica tube, alumina oxide matrix porous ceramic, cordierite, a rock wool board, a rock wool felt, or other materials with a low thermal conductivity.

It should be noted that, an infrared transmitter formed by the infrared electrothermal coating 122, the first electrode 123, and the second electrode 124 is not limited to the example in FIG. 3. In another example, the infrared transmitter may be formed by a thermal excited infrared radiation layer, or may be constructed by a thin film wound on the base body 121.

It should be further noted that, in the foregoing example, the heater 12 is described in an infrared heating manner. In another example, the heating manner of the heater 12 may be resistance heating, electromagnetic heating, or the like, which is not limited herein.

Still referring to FIG. 2, the aerosol generation device 100 further includes a heat drain device 16.

The heat drain device 16 is arranged on a gas flow path (shown by a dotted arrow in the figure) extending among the air inlet 102, the cavity 11, and the through hole 101. Specifically, the heat drain device 16 is arranged between the air inlet 102 and the cavity 11, and the heat drain device 16 is constructed to, after starting operation, drain an airflow toward the through hole 101, that is, a direction shown by the dotted arrow in the figure. It can be understood that, the airflow may be alternatively drained toward the air inlet 102. When the airflow is drained toward the through hole 101, moisture in the aerosol-forming article can be easily drained out of the housing. The heat drain device 16 may be a fan or a similar device.

The circuit 14 is configured, after the heater 12 starts for heating and before the heater 12 enters an inhalation stage, control the heat drain device 16 to start operation to drain hot air generated by heating out of the housing 10 along the gas flow path.

Figure 4:
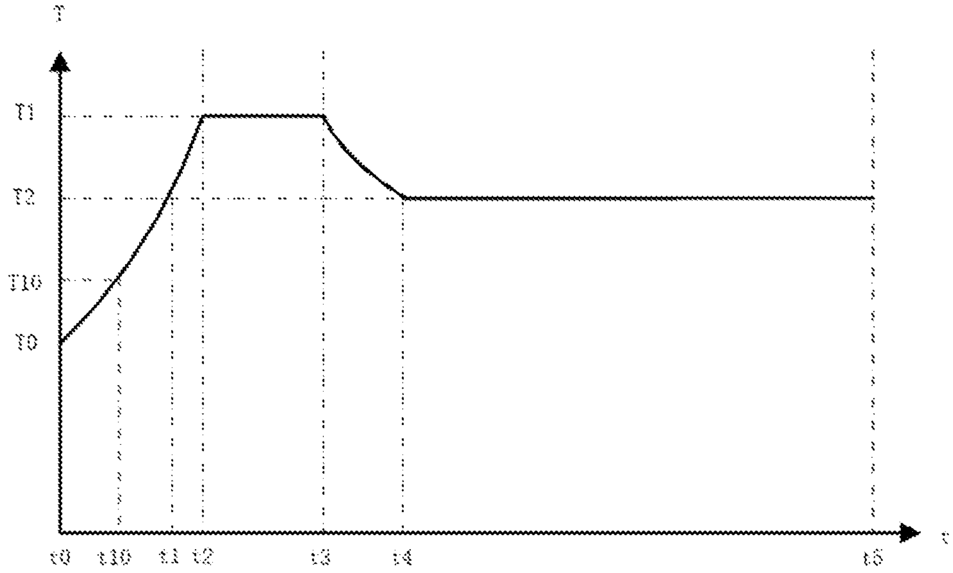
FIG. 4 is a schematic diagram of a heating curve of a heater according to an implementation of this application.

Referring to FIG. 4, usually, a time-based temperature variation curve of the heater 12 includes a temperature rise stage, a temperature preservation stage, and an inhalation stage.

At the temperature rise stage, a temperature of the heater 12 rises from an initial temperature T0 (or an environment temperature) to a maximum operating temperature T1. Usually, T1 may be 150° C.-400° C.

At the temperature preservation stage, the temperature of the heater 12 maintains at a preset target temperature T1 for a period of time, so that the aerosol-forming substrate is fully pre-heated, and an inhalation taste for a user is improved.

A duration of the temperature rise stage is t0-t2, a duration of the temperature preservation stage is t2-t3, and t0-t3 is a preheating time of the heater 12. Usually, the preheating time of the heater 12 is 5 s-30 s.

At the inhalation stage, the temperature of the heater 12 decreases from the maximum operating temperature T1 to an expected operating temperature T2, and the expected operating temperature T2 is an optimal temperature for the aerosol-forming substrate to generate an aerosol. Generally, T2 may be 150° C.-350° C. At this stage, the temperature of the heater 12 usually maintains at the expected operating temperature T2 or fluctuates around the expected operating temperature T2, and t4-t5 is a maintaining time.

It should be noted that, a heating curve of the heater 12 is not limited to the case in FIG. 4. In another example, it is also possible that the heating curve of the heater 12 has only the temperature rise stage and the inhalation stage.

It can be learned from FIG. 4 that, to avoid a problem that the smoker feels burning pain due to the high temperature of the aerosol when the smoker inhales the first puff, the circuit 14 needs to control, before the inhalation stage (a time point t3 or t4), the heat drain device 16 to start operation to drain the hot air generated by heating out of the housing 10 along the gas flow path.

In an example, the aerosol generation device 100 further includes a temperature detection device (not shown in the figure) configured to detect temperature information of the heater 12.

The circuit 14 is configured to: after the heater 12 starts for heating, obtain the temperature information of the heater 12 that is detected by the temperature detection device; and when a temperature of the heater 12 reaches a preset temperature, control the heat drain device 16 to start operation to drain an aerosol generated by heating out of the housing 10 along the gas flow path.

When the preset temperature is lower than the maximum operating temperature T1 of the heater 12, that is, the heat drain device 16 is controlled, before the time point t2, to start operation to drain the aerosol generated by heating out of the housing 10 along the gas flow path.

In an example, the circuit 14 is configured to: after the heater 12 starts for heating, record a heating time of the heater 12; and when the heating time of the heater 12 reaches a preset time, control the heat drain device 16 to start operation to drain the aerosol generated by heating out of the housing 10 along the gas flow path.

The preset time is less than a duration in which the temperature of the heater 12 rises from an initial temperature to the maximum operating temperature. That is, the heat drain device 16 is controlled, before the time point t2, to start operation to drain the aerosol generated by heating out of the housing 10 along the gas flow path.

Further, at a time point t10, most of moisture in the cigarette is evaporated at a heating temperature T10 of the heater 12, so that at the time point t10, the heat drain device 16 can be controlled to start operation to drain the hot air generated by heating out of the housing 10 along the gas flow path, to avoid a problem that inhaling experience is reduced due to a small smoke volume when the smoker inhales the first puff because the aerosol generated by heating is drained out of the housing 10 along the gas flow path when the inhalation stage approaches. Usually, T10 may be 80° C.-200° C.

Further, the circuit 14 is further configured to, when the smoker inhales on the aerosol generation device 100, control the heat drain device 16 to stop operation. That is, when a user inhales (in a period of t4-t5), the heat drain device 16 stops operation, and in this case, the user can inhale an aerosol of a relatively low temperature.

It should be noted that, the heat drain device 16 stopping operation is not limited to this case. For example: the heat drain device 16 stops operation after operating for a period of time, and does not need to stop operation until the smoker can inhale on the aerosol generation device 100. It is easy to imagine that, in an operation period of the heat drain device 16, an operating power of the heat drain device 16 is also adjustable, that is, the heat drain device 16 can be controlled to operate for a specified time at a specified operating power.

Based on the aerosol generation device 100, this application further provides a control method of the aerosol generation device, and the method includes:

after the heater 12 starts for heating and before the heater 12 enters an inhalation stage, controlling the heat drain device 16 to start operation to drain hot air generated by heating out of the housing 10 along the gas flow path, where a temperature variation curve of the heater 12 includes at least a temperature rise stage and the inhalation stage.

Figure 5:
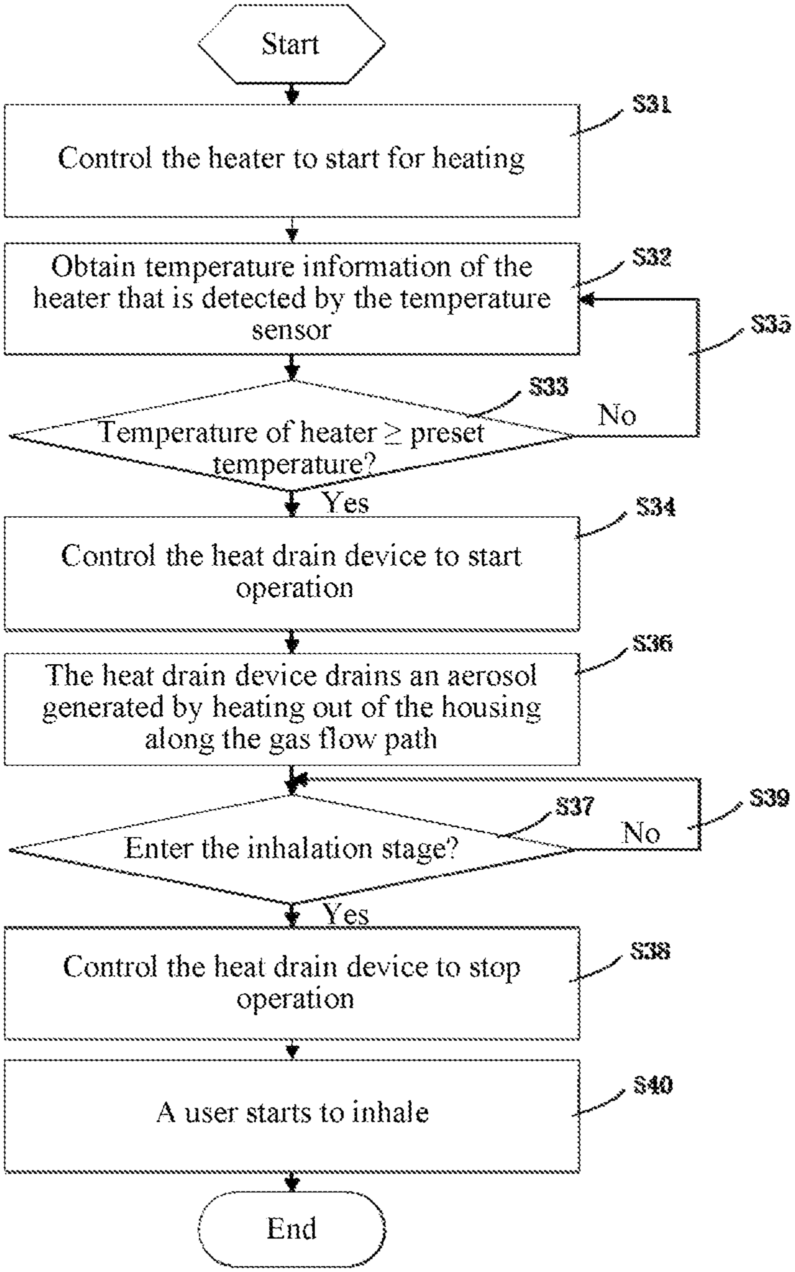
FIG. 5 is a schematic diagram of a control process of an aerosol generation device according to an implementation of this application.

FIG. 5 is a schematic diagram of a control process of an aerosol generation device according to an implementation of this application. The control process of the aerosol generation device includes the following steps:

S31: Control the heater 12 to start for heating after a cigarette is inserted into the cavity 11.

S32: Obtain temperature information of the heater 12 that is detected by the temperature sensor.

S33: Determine whether a temperature of the heater 12 is higher than or equal to a preset temperature?

S34: If the temperature of the heater 12 is higher than or equal to the preset temperature, control the heat drain device 16 to start operation; or otherwise, continue to perform step S32 (step S35).

S36: The heat drain device 16 drains an aerosol generated by heating out of the housing 10 along the gas flow path.

S37: Determine whether the heater 12 enters the inhalation stage?

S38: If the heater 12 enters the inhalation stage, control the heat drain device 16 to stop operation; or otherwise, continue to perform step S37 (step S39);

S40: A user starts to inhale.

It should be noted that, the specification of this application and the accompanying drawings thereof illustrate preferred embodiments of this application. However, this application may be implemented in various different forms, and is not limited to the embodiments described in this specification. These embodiments are not intended to be an additional limitation on the content of this application, and are described for the purpose of providing a more thorough and comprehensive understanding of the content disclosed in this application. Moreover, the foregoing technical features are further combined to form various embodiments not listed above, and all such embodiments shall be construed as falling within the scope of this application. Further, a person of ordinary skill in the art may make improvements or modifications according to the foregoing description, and all the improvements and modifications shall fall within the protection scope of the attached claims of this application.

The invention claimed is:

1. An aerosol generation device, configured to heat an aerosol-forming substrate to generate an aerosol for inhalation, and comprising:

a housing, provided with a through hole and an air inlet;

a cavity, wherein the aerosol-forming substrate is received in the cavity or removed from the cavity through the through hole;

a heater, configured to heat the aerosol-forming substrate received in the cavity;

a heat drain device, arranged on a gas flow path extending between the air inlet and the through hole; and a circuit, configured to, after the heater starts for heating and before the heater enters an inhalation stage, control the heat drain device to start operation to drain hot air generated by heating out of the housing along the gas flow path, wherein a temperature variation curve of the heater comprises at least a temperature rise stage and the inhalation stage.

2. The aerosol generation device according to claim 1, wherein the housing has a near end and a far end opposite to each other; and the through hole is provided on the near end of the housing, and the air inlet is provided on the far end of the housing.

3. The aerosol generation device according to claim 2, wherein the heat drain device is arranged between the air inlet and the cavity.

4. The aerosol generation device according to claim 1, wherein the heat drain device is constructed to drain an airflow toward the through hole after starting operation.

5. The aerosol generation device according to claim 1, wherein the aerosol generation device further comprises a temperature detection device configured to detect temperature information of the heater; and the circuit is configured to: after the heater starts for heating, obtain the temperature information of the heater that is detected by the temperature detection device; and when a temperature of the heater reaches a preset temperature, control the heat drain device to start operation to drain an aerosol generated by heating out of the housing along the gas flow path.

6. The aerosol generation device according to claim 5, wherein the preset temperature is lower than a maximum operating temperature of the heater.

7. The aerosol generation device according to claim 1, wherein the circuit is configured to: after the heater starts for heating, record a heating time of the heater; and when the heating time of the heater reaches a preset time, control the heat drain device to start operation to drain an aerosol generated by heating out of the housing along the gas flow path.

8. The aerosol generation device according to claim 7, wherein the preset time is less than a duration in which a temperature of the heater rises from an initial temperature to a maximum operating temperature.

9. The aerosol generation device according to claim 1, wherein the circuit is further configured to, when a smoker inhales on the aerosol generation device, control the heat drain device to stop operation.

10. The aerosol generation device according to claim 1, wherein the heater comprises:

a base body, having a surface; and an infrared transmitter, arranged on the surface, wherein the infrared transmitter is configured to generate infrared rays to perform radiant heating on the aerosol-forming substrate received in the cavity.

11. A control method of an aerosol generation device, comprising:

after a heater starts for heating and before the heater enters an inhalation stage, controlling a heat drain device to start operation to drain hot air generated by heating out of a housing along a gas flow path, wherein a temperature variation curve of the heater comprises at least a temperature rise stage and the inhalation stage.

12. The aerosol generation device according to claim 2, wherein the heat drain device is constructed to drain an airflow toward the through hole after starting operation.

13. The aerosol generation device according to claim 3, wherein the heat drain device is constructed to drain an airflow toward the through hole after starting operation.

14. The aerosol generation device according to claim 2, wherein the aerosol generation device further comprises a temperature detection device configured to detect temperature information of the heater; and the circuit is configured to: after the heater starts for heating, obtain the temperature information of the heater that is detected by the temperature detection device; and when a temperature of the heater reaches a preset temperature, control the heat drain device to start operation to drain an aerosol generated by heating out of the housing along the gas flow path.

15. The aerosol generation device according to claim 3, wherein the aerosol generation device further comprises a temperature detection device configured to detect temperature information of the heater; and the circuit is configured to: after the heater starts for heating, obtain the temperature information of the heater that is detected by the temperature detection device; and when a temperature of the heater reaches a preset temperature, control the heat drain device to start operation to drain an aerosol generated by heating out of the housing along the gas flow path.

16. The aerosol generation device according to claim 4, wherein the aerosol generation device further comprises a temperature detection device configured to detect temperature information of the heater; and the circuit is configured to: after the heater starts for heating, obtain the temperature information of the heater that is detected by the temperature detection device; and when a temperature of the heater reaches a preset temperature, control the heat drain device to start operation to drain an aerosol generated by heating out of the housing along the gas flow path.

17. The aerosol generation device according to claim 2, wherein the circuit is configured to: after the heater starts for heating, record a heating time of the heater; and when the heating time of the heater reaches a preset time, control the heat drain device to start operation to drain an aerosol generated by heating out of the housing along the gas flow path.

18. The aerosol generation device according to claim 3, wherein the circuit is configured to: after the heater starts for heating, record a heating time of the heater; and when the heating time of the heater reaches a preset time, control the heat drain device to start operation to drain an aerosol generated by heating out of the housing along the gas flow path.

19. The aerosol generation device according to claim 4, wherein the circuit is configured to: after the heater starts for heating, record a heating time of the heater; and when the heating time of the heater reaches a preset time, control the heat drain device to start operation to drain an aerosol generated by heating out of the housing along the gas flow path.

* * * * *